Patented Dec. 1, 1925.

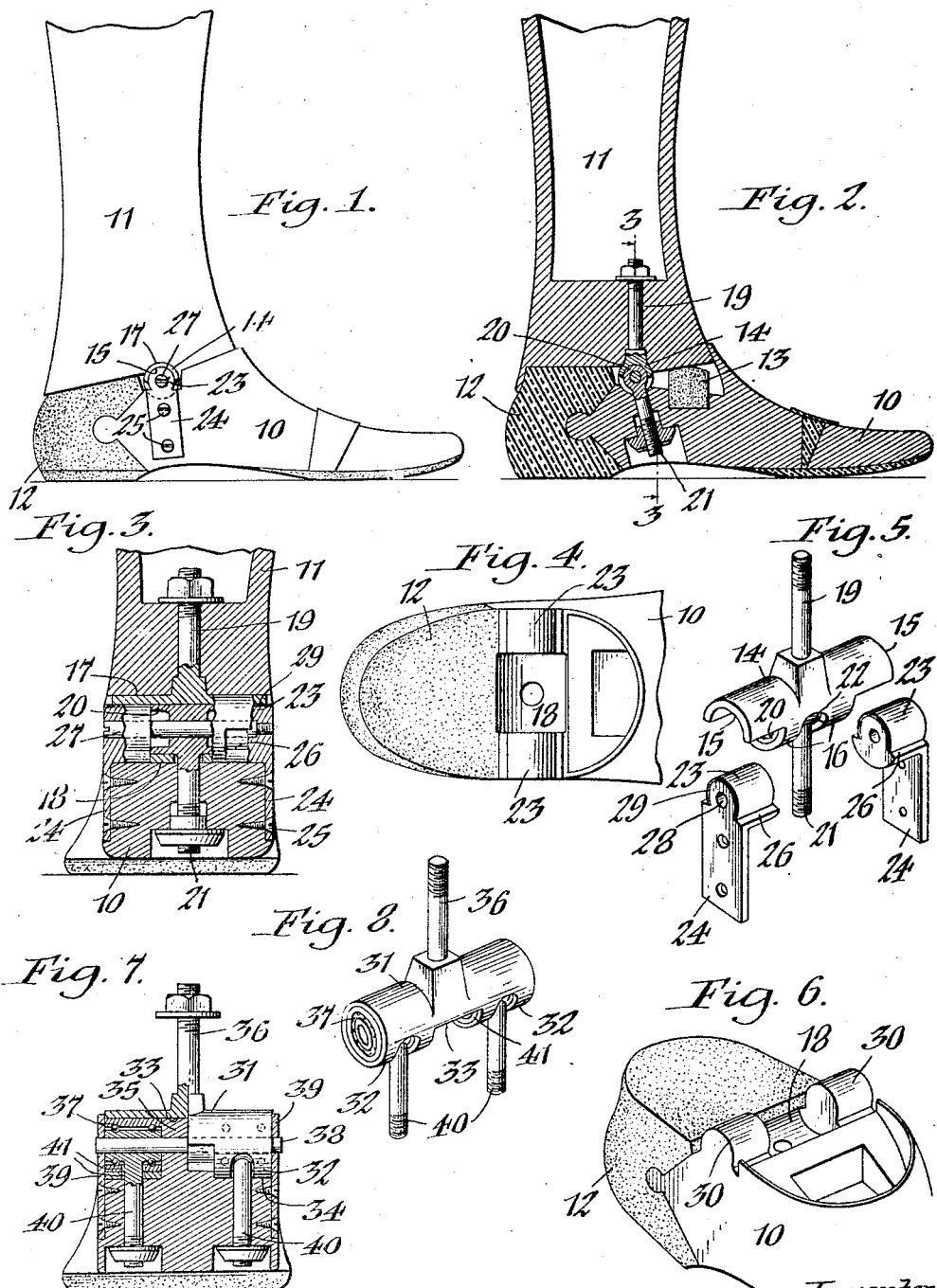
Dec. 1, 1925. 1,564,166
C. B. WINN
ANKLE JOINT FOR ARTIFICIAL LIMBS
Filed Dec. 29, 1924
Inventor,
Chester B. Winn,
by Geyer & Geyer
Attorneys.

1,564,166

UNITED STATES PATENT OFFICE.

CHESTER B. WINN, OF BUFFALO, NEW YORK.

ANKLE JOINT FOR ARTIFICIAL LIMBS.

Application filed December 29, 1924. Serial No. 758,593.

*To all whom it may concern:*

Be it known that I, CHESTER B. WINN, a citizen of the United States, residing in Buffalo, in the county of Erie and State of New York, have invented new and useful Improvements in Ankle Joints for Artificial Limbs, of which the following is a specification.

The invention relates generally to artificial limbs but more particularly to improvements in the ankle-joints or journals of such limbs.

Its chief object is to provide a simple and substantial joint or journal of this character with a view of gaining greater firmness and security in retaining the leg and foot sections in alinement and in proper working relation.

A further object of the invention is the provision of an ankle-joint which is reliably held against lateral or endwise displacement and so constructed as to reduce the wear on the parts thereof to a minimum.

In the accompanying drawings:—Figure 1 is a fragmentary side elevation of an artificial leg embodying my invention. Figure 2 is a central longitudinal section thereof. Figure 3 is an enlarged transverse section on line 3—3, Fig. 2. Figure 4 is a top plan view of that part of the joint contained in the foot-section of the leg. Figure 5 is a detached perspective view of the complementary parts of the joint. Figure 6 is a fragmentary perspective view of a modified form of the joint. Figure 7 is a transverse section, partly in elevation, showing another modification of the improvement. Figure 8 is a perspective view of the joint of the last-mentioned modification.

Similar characters of reference indicate corresponding parts throughout the several views.

The artificial limb illustrated in the drawings, comprises a foot 10 and a leg or shin-section 11, the foot having an elastic heel-block 12 and a cushion 13 disposed in front of the ankle-joint between the opposing faces of the foot and leg member.

In the preferred construction of the improved ankle-joint or journal shown in Figs. 1–5, inclusive, the same comprises a transverse sleeve or bearing member 14 having substantially semi-cylindrical concave bearing surfaces 15 at its opposite ends and a convex bearing surface 16 intermediate the latter. The upper side of this sleeve is seated in a recess or cavity 17 in the bottom of the leg member 11, while the lower convex portion 16 thereof engages a complementary concave bearing seat or surface 18 formed in the opposing upper portion of the foot 10. Said sleeve may be secured to the leg member by an upright bolt 19 or other suitable fastening. A hollow journal pin 20 is journaled in the central or convex bearing portion of the sleeve and fastened to the foot by a bolt 21 passing through a transverse slot 22 in the bottom of the sleeve.

The upper portion of the foot 10 is provided on opposite sides of its concave bearing surface 18 with convex bearings or trunnions 23 upon which the companion concave bearings 15 of the sleeve 14 rest, as shown in Figs. 3 and 4. Said convex bearings 23 may be carried by attaching plates or brackets 24 secured to opposite sides of the foot by screws 25 or other appropriate fastenings. The bottom portions of these convex bearings are somewhat larger in diameter than their upper portions, the resulting upwardly-facing shoulders 26 constituting stops with which the opposing ends of the concave sleeve-bearings 15 are adapted to abut for limiting the swinging action of the leg relative to the foot. The bottoms of the convex bearings 23 are preferably seated in the end portions of the concave foot-bearing 18. As shown in Fig. 3, the ends of the convex journal bearing 16 abut against the opposing inner ends of the corresponding foot-bearings 24.

For the purpose of attaining additional strength and security, a horizontal shaft or bolt 27 may be extended through the hollow journal-pin 20 and alining openings 28 in the convex journal bearings 23. The latter may be faced with leather 29 or similar material to form a silent joint.

By constructing the ankle-joint with alternating complemental convex or concave bearings, with a comparatively deep center seating of the convex portion 16 of the journal, the bearings are not only protected, but lateral or endwise displacement of the parts is effectually prevented, thereby producing a firm, extensive and rigid joint capable of withstanding the severe strains which are imposed upon it. Furthermore, by the interlocking arrangement of the convex and concave bearings, the foot is held against moving sidewise or twisting, with the result that the leg and foot sections are maintained in alinement and in proper working relation.

If desired, instead of making the convex bearings 24 separate or detachable from the foot 10, they may be formed in one piece with the wooden portion thereof, as shown at 30 in Fig. 6.

As a further modification of the invention, the arrangement of the convex and concave bearings may be reversed, as illustrated in Figs. 7 and 8. In this case, the journal sleeve 31 is provided at opposite ends with convex bearing surfaces 32 and in its center with a concave bearing surface 33, the convex bearing surfaces engaging complementary concave sets 34 formed in the opposing upper portion of the foot 10, while the concave bearing surface rests on a central convex bearing 35 of the foot. The journal-sleeve is secured to the leg member 11 by an upright bolt 36 and its ends are supported in anti-friction or ball bearings 37. A horizontal shaft 38 extends through the opposed bearings and is supported at its ends in plates 39 fastened to the opposite sides of the foot. The outer rings of the anti-friction bearings 37 are pressed into the ends of the journal-sleeve 31, while the inner rings are pressed on the shaft 38, said inner rings being secured to the foot by bolts 40 passing through alining transverse slots 41 in the sleeve and outer bearing ring, respectively.

The invention is susceptible of other changes, within the scope of the appended claims, and I do not therefore wish to be limited to the particular embodiment of the invention herein shown and described.

I claim as my invention:—

1. An ankle-joint for artificial limbs, comprising a journal carried by the leg-member and having both convex and concave bearing surfaces, and opposed complemental concave and convex bearing surfaces applied to the foot.

2. An ankle-joint for artificial limbs, comprising a journal carried by the leg-member and having alternately arranged convex and concave bearings, and opposed complemental concave and convex bearings applied to the foot, the ends of the convex journal-bearings abutting against the opposing ends of the corresponding foot-bearings.

3. An ankle-joint for artificial limbs, comprising a journal carried by the leg-member and having both convex and concave bearing portions, a pin journaled in the convex bearing portions, means for connecting said journal and said pin to the leg member and foot, respectively, and opposed complemental concave and convex bearings applied to the foot.

4. An ankle-joint for artificial limbs, comprising a journal carried by the leg-member and having both convex and concave bearing surfaces, opposed complemental concave and convex bearing surfaces applied to the foot, and a transverse shaft extending axially through the journal-bearings and the foot-bearings.

5. An ankle-joint for artificial limbs, comprising a journal carried by the leg-member and having a central convex bearing and concave end bearings, and bearing trunnions applied to opposite sides of the foot for engagement with the concave bearings of said journal, the foot having a concave bearing between said trunnions for receiving the convex journal-bearings.

6. An ankle-journal, comprising a sleeve having alternately-disposed concave and convex bearing surfaces and means for connecting the sleeve to the leg and foot members of an artificial limb.

7. An ankle-journal, comprising a sleeve having alternately-disposed concave and convex bearing surfaces, and fastening bolts applied to those portions of the sleeve containing said convex bearing-surfaces and extending in opposite directions therefrom.

CHESTER B. WINN.